US011627339B2

(12) United States Patent
Cai et al.

(10) Patent No.: US 11,627,339 B2
(45) Date of Patent: Apr. 11, 2023

(54) METHODS AND DEVICES FOR ENCODING AND RECONSTRUCTING A POINT CLOUD

(71) Applicant: INTERDIGITAL VC HOLDINGS, INC., Wilmington, DE (US)

(72) Inventors: Kangying Cai, Rennes (FR); Wei Hu, Rennes (FR); Sebastien Lasserre, Thorigné Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/616,491

(22) PCT Filed: Apr. 12, 2018

(86) PCT No.: PCT/EP2018/059420
§ 371 (c)(1),
(2) Date: Nov. 24, 2019

(87) PCT Pub. No.: WO2018/215134
PCT Pub. Date: Nov. 29, 2018

(65) Prior Publication Data
US 2020/0092584 A1   Mar. 19, 2020

(30) Foreign Application Priority Data
May 24, 2017  (EP) .................................... 17305610

(51) Int. Cl.
*H04N 19/62*   (2014.01)
*H04N 19/18*   (2014.01)

(52) U.S. Cl.
CPC ............. *H04N 19/62* (2014.11); *H04N 19/18* (2014.11)

(58) Field of Classification Search
CPC ...... H04N 19/18; H04N 19/597; H04N 19/60; H04N 19/62
(Continued)

(56) References Cited

U.S. PATENT DOCUMENTS 7,940,279 B2   5/2011   Pack
9,035,807 B2   5/2015   Jiang et al.
(Continued)

FOREIGN PATENT DOCUMENTS

CN   105630905 A   6/2016
CN   106407408 A   2/2017
(Continued)

OTHER PUBLICATIONS

Thanou et al., "Graph-Based Compression of Dynamic 3D Point Cloud Sequences", IEEE Transactions on Image Processing, vol. 25, No. 4, Apr. 2016, pp. 1765-1778. (Year: 2016).*
(Continued)

*Primary Examiner* — Kathleen V Nguyen
(74) *Attorney, Agent, or Firm* — Condo Roccia Koptiw LLP

(57) ABSTRACT

This method comprises: —accessing (2) a point cloud (PC) comprising a plurality of points defined by attributes, said attributes including a spatial position of a point in a 3D space and at least one feature of the point;—segmenting (2) the point cloud into one or more clusters ($C_i$) of points on the basis of the attributes of the points; and for at least one cluster ($C_i$):—constructing (4) a similarity graph having a plurality of vertices and at least one edge, the similarity graph representing a similarity among neighboring points of the cluster ($C_i$) in terms of the attributes, the plurality of vertices including vertices $P_i$ and $P_j$ corresponding to points of the cluster ($C_i$);—assigning one or more weights $w_{i,j}$ to one or more edges connecting vertices $P_i$ and $P_j$ of the graph;—computing (6) a transform using the one or more assigned weights, said transform being characterized by coefficients; and—quantizing (8) and encoding (10) the transform coefficients.

9 Claims, 4 Drawing Sheets

Serialized Octree:
00000100 01000001 00011000 00100000

(58) Field of Classification Search
USPC .................................................... 375/140.18
See application file for complete search history.

(56) References Cited

U.S. PATENT DOCUMENTS

| | | | |
|---|---|---|---|
| 9,111,333 B2 | 8/2015 | Jiang et al. | |
| 9,214,042 B2 | 12/2015 | Cai et al. | |
| 2013/0293532 A1* | 11/2013 | Vaddadi | G06T 15/005 |
| | | | 345/419 |
| 2014/0192050 A1* | 7/2014 | Qiu | G06K 9/00214 |
| | | | 345/420 |
| 2015/0003723 A1* | 1/2015 | Huang | G06K 9/6269 |
| | | | 382/154 |
| 2017/0046589 A1 | 2/2017 | Poelman et al. | |
| 2018/0041760 A1 | 2/2018 | Koo et al. | |
| 2018/0081034 A1 | 3/2018 | Guo | |
| 2018/0091735 A1* | 3/2018 | Wang | H04N 19/597 |
| 2018/0199037 A1* | 7/2018 | Philippe | H04N 19/61 |

FOREIGN PATENT DOCUMENTS

| | | |
|---|---|---|
| JP | 2000113224 A | 4/2000 |
| JP | 2010250634 * | 11/2010 |
| WO | WO 2016129872 A1 | 8/2016 |

OTHER PUBLICATIONS

TiAN et al., CDVA CE2: Graph transform for keypoint trajectory coding 1, Internationa! Organization for Standardization, ISO/iEC JTC1/SC29AA/G11, Coding of Moving Pictures and Audio, ISQ/IEC JTC1/SC29/WG11 MPEG2016/m38671, Geneva, Switzerland, May-Jun. 2016, 8 pages. (Year: 2016).*

English translation of JP 2010250634, Yasuhisa et al. (Year: 2010).*

Collet et al., "High-Quality Streamable Free-Viewpoint Video", ACM Transactions on Graphics, vol. 34, No. 4, Article No. 69, Jul. 2015, 13 pages.

Anonymous, "Current Status on Point Cloud Compression", International Organization on Standardization, ISO/IEC JTC1/SC29/WG11, Coding of Moving Pictures and Audio, ISO/IEC JTC1/SC29/WG11 N15869, Geneva, Switzerland, Oct. 2015, 11 pages.

Ainala et al., "Plane Projection Approximation and Learning Based Voxel Geometry Compression", International Organization on Standardization, ISO/IEC JTC1/SC29/WG11, Coding of Moving Pictures and Audio, ISO/IEC JTC1/SC29/WG11 MPEG2012/M38816, Geneva, Switzerland, May 2016, 6 pages.

Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

Shi et al., "Normalized Cuts and Image Segmentation", IEEE Transactions on Pattern Analysis and Machine Intelligence, vol. 22, No. 8, Aug. 2000, pp. 888-905.

Mekuria et al., "3DTI Mesh Coding Architecture and Basic Implementation", International Organization for Standardization, ISO/IEC JTC1/SC29/WG11, Coding of Moving Pictures and Audio, ISO/IEC JTC1/SC29/WG11 MPEG2014/m35196, Strasbourg, France, Oct. 2014, 6 pages.

Natali et al., "Graph-based representations of point clouds", Graphical Models, vol. 73, No. 5, Sep. 2011, pp. 151-164.

Anis et al., "Compression of Dynamic 3D Point Clouds Using Subdivisional Meshes and Graph Wavelet Transforms", 2016 IEEE International Conference on Acoustics, Speech and Signal Processing (ICASSP), Shanghai, China, Mar. 20, 2016, 5 pages.

De Queiroz et al., "Compression of 3D Point Clouds Using a Region-Adaptive Hierarchical Transform", IEEE Transactions on Image Processing, vol. 25, No. 8, Aug. 2016, pp. 3947-3956.

Huang et al., "A Generic Scheme for Progressive Point Cloud Coding", IEEE Transactions on Visualization and Computer Graphics, vol. 14, No. 2, Mar.-Apr. 2008, pp. 440-453.

Peng et al., "Geometry-guided Progressive Lossless 3D Mesh Coding with Octree (OT) Decomposition", ACM Transactions on Graphics, vol. 24, No. 3, Jul. 2005, pp. 609-616.

Digne et al., "Self-similarity for Accurate Compression of Point Sampled Surfaces", Computer Graphics Forum, vol. 33, No. 2, May 2014, pp. 155—164.

Mekuria et al., "A Basic Geometry Driven Mesh Coding Scheme with Surface Simplification for 3DTI", IEEE Multimedia Communications Technical Committee e-Letter, vol. 9, No. 3, May 2014, pp. 6-7.

Tian et al., "CDVA CE2: Graph transform for keypoint trajectory coding", International Organization for Standardization, ISO/IEC JTC1/SC29/WG11, Coding of Moving Pictures and Audio, ISO/IEC JTC1/SC29/WG11 MPEG2016/m38671, Geneva, Switzerland, May-Jun. 2016, 8 pages.

Ochotta et al., "Compression of Point-Based 3d Models by Shape-Adaptive Wavelet Coding of Multi-Height Fields", Eurographics Symposium on Point-Based Graphics, Goslar, Germany, Jun. 2, 2004, pp. 103-112.

Isenburg, M., "LASzip: lossless compression of LiDAR data", Photogrammetric Engineering and Remote Sensing, vol. 79, No. 2, Feb. 2013, 10 pages.

Thanou et al., "Graph-Based Motion Estimation and Compensation for Dynamic 3D Point Cloud Compression", IEEE International Conference on Image Processing (ICIP), Quebec City, Canada, Sep. 27, 2015, pp. 3235-3239.

Kammerl et al., "Real-time Compression of Point Cloud Streams", 2012 IEEE International Conference on Robotics and Automation (ICRA), Saint Paul, Minnesota, USA, May 14, 2012, pp. 778-785.

Cohen et al., "Attribute compression for sparse point clouds using graph transforms", IEEE International Conference on Image Processing (ICIP), Phoenix, Arizona, USA, Sep. 25, 2016, 7 pages.

Kathariya et al., "Plane Projection Approximation for Voxel Color Attributes Compression", International Organization for Standardization, ISO/IEC JTC1/SC29/WG11, Coding of Moving Pictures and Audio, ISO/IEC JTC1/SC29/WG11 MPEG2012/M38801, Geneva, Switzerland, May 2016, 5 pages.

Zhang et al., "Point Cloud Attribute Compression with Graph Transform", IEEE International Conference on Image Processing (ICIP), Paris, France, Oct. 27, 2014, pp. 2066-2070.

Anis et al., "Efficient Sampling Set Selection for Bandlimited Graph Signals Using Graph Spectral Proxies", IEEE Transactions on Signal Processing, vol. 64, No. 14, Jul. 15, 2015, pp. 3775-3789.

Thanou et al., "Graph-Based Compression of Dynamic 3D Point Cloud Sequences", IEEE Transactions on Image Processing, vol. 25, No. 4, Apr. 2016, pp. 1765-1778.

Hammond, et al., "Wavelets on graphs via spectral graph theory", Applied and Computational Harmonic Analysis, vol. 30, Elsevier, Apr. 28, 2010, pp. 129-150.

Shen, Godwin, "Lifting Transforms on Graphs: Theory and Applications", USC-SIPI Report #403, University of Southern California, Signal and Image Processing Institute, Aug. 2010, 158 pages.

English Translation of JP 2000113224A, 18 pages.

* cited by examiner

METHODS AND DEVICES FOR ENCODING AND RECONSTRUCTING A POINT CLOUD

CROSS REFERENCE TO RELATED APPLICATIONS

This application is the national stage entry under 35 U.S.C. § 371 of International Application PCT/IEP20181059420, filed Apr. 12, 2018, which was published in accordance with PCT Article 21(2) on Nov. 29, 2018, in English, and which claims the benefit of European Patent Application No. 17305610.2, filed May 24, 2017.

FIELD OF THE INVENTION

The present disclosure generally relates to the field of point cloud data sources.

More particularly, it deals with point cloud compression (PCC).

Thus, the disclosure concerns a method for encoding a point cloud and a corresponding encoder.

It also concerns a method for reconstructing a point cloud and a corresponding decoder. It further concerns computer programs implementing the encoding and reconstructing methods of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point cloud consists in a set of points. Each point is defined by its spatial location (x, y, z), i.e. geometry information, and different attributes, which typically include the color information in (R, G, B) or (Y, U, V) or any other color coordinate system. Geometry can be regarded as one of the attribute data. In the rest of this disclosure, both geometry and other attribute data are considered as attributes of points.

Point cloud data sources are found in many applications. Important applications relying on huge point cloud data sources can be found in geographic information systems, robotics, medical tomography and scientific visualization.

Beyond these applications that are more industrial and scientifically oriented, the rise in popularity of inexpensive 3D scanners based on time of flight or other depth sensing technologies, 3D capturing on mobile devices and the rise of cloud based 3D printing are creating a huge demand for large scale interoperable compressed 3D point cloud storage and transmission data formats in the consumer market.

Scanned 3D point clouds often have thousands of points and occupy large amounts of storage space. Additionally, they can be generated at a high rate when captured live from 3D scanners, increasing the data rate even further. Therefore, point cloud compression is critical for efficient networked distribution and storage.

While there has been quite some work on point cloud compression in the 3D graphics and robotics domains, they generally do not address some of the requirements for building efficient interoperable and complete end-to-end 3D multimedia systems.

For example, the coding of color and other attribute values, which are important for high quality rendering, are often ignored or dealt with inefficiently, for example by performing a simple one way predictive coding of colors.

Also, compression of time-varying point clouds, i.e. sequences of clouds captured at a fast rate over time, is limited. Furthermore, methods with low complexity and lossy encoding are of interest for systems where hardware/bandwidth limitations apply or where a low delay is critical. Research in point cloud compression still needs to happen to address these challenges.

Different coding methods of the point clouds have been proposed in the prior art.

The first coding approach is based on the octree based point-cloud representation. It is described, for instance, in J. Peng and C.-C. Jay Kuo, "Geometry-guided progressive lossless 3D mesh coding with octree (OT) decomposition," ACM Trans. Graph, vol. 21, no. 2, pp. 609-616, July 2005 and in Yan Huang, Jingliang Peng, C.-C. Jay Kuo and M. Gopi, "A Generic Scheme for Progressive Point Cloud Coding," IEEE Transactions on Visualization and Computer Graphics, vol. 14, no. 2, pp. 440-453, 2008.

An octree is a tree data structure where every branch node represents a certain cube or cuboid bounding volume in space. Starting at the root, every branch has up to eight children, one for each sub-octant of the node's bounding box.

An example is shown in FIG. 1 and the left half of FIG. 2.

For compression, a single bit is used to mark whether every child of a branch node is empty and then this branch node configuration can be efficiently represented in a single byte, assuming some consistent ordering of the eight octants. By traversing the tree in breadth-first order and outputting every child node configuration byte encountered, the point distribution in space can be efficiently encoded. Upon reading the encoded byte stream, the number of bits set in the first byte tells the decoder the number of consecutive bytes that are direct children. The bit positions specify the voxel/child in the octree they occupy. The right half side of FIG. 2 illustrates this byte stream representation for the octree represented in the left half side.

Due to its hierarchical nature, the octree representation is very efficient in exploiting the sparsity of point clouds. Thus, octree decomposition based strategy is very efficient for compressing sparse point clouds. However, octree-based representation is inefficient for representing and compressing watertight dense point clouds. Moreover, most of the existing octree-based point cloud representations independently represent geometry and other attributes of points.

The second coding approach is based on the segmentation based point cloud representation. It is described, for instance, in T. Ochotta and D. Saupe, "Compression of point-based 3d models by shape-adaptive wavelet coding of multi-heightfields," in Proc. Eurographics Symp. on Point-Based Graphics, 2004, and in J. Digne, R. Chaine, S. Valette, et al, "Self-similarity for accurate compression of point sampled surfaces," Computer Graphics Forum, vol. 33, p. 155-164, 2014.

The segmentation based point cloud representation comprises three steps: plane-like decomposition, plane projection and coding. In the first step, the point cloud data is segmented into plane-like patches. Then, the resultant patches are projected onto one or several planes. In the last step, the projected image(s) are compressed. Efficient image/video compression techniques can be used for compressing the projected image(s).

Plane-like segmentation based PCC has been proved to be very efficient at coding dense point clouds which represent approximate piecewise linear surfaces. However, there are several disadvantages of segmentation-based PCC. Indeed, this method requires resampling onto a regular grid, which introduces approximation errors. Also, it is necessary to generate a large number of patches for complex shapes, which implies a high computation complexity for complicated textures. Moreover, this method processes independently geometry and other properties.

There are works trying to combine the advantages of the above two representations of point clouds such as J. K. N. Blodow, R. Rusu, S. Gedikli and E. S. M Beetz, "Real-time compression of point cloud streams," in *Robotics and Automation* (ICRA), 2012 *IEEE International Conference on*, pp. 778, 785, 14-18 May 2012.

These works first decompose the input point clouds in the manner of octree decomposition. After each cuboid division operation, it is checked whether the points falling into the same newly generated leaf cuboid can be approximated by a plane. If the answer is yes, the division of the corresponding cuboid is stopped and the related points are encoded by projecting on the corresponding plane. Then, the positions of the plane-like patches can be efficiently represented and compressed by the octree method.

However, all these known methods do not provide an efficient representation and encoding of the attribute data of point clouds.

In the article of Collet et al. "High-quality streamable free-viewpoint video", ACM Transactions on Graphics, vol. 34, no. 4, 2015, point clouds are converted into 3D meshes and then a state-of-the-art 3D mesh compression technique is used to encode the point clouds. However, this method, which requires the conversion of the point cloud into a mesh, is usually computationally expensive and extra bits are required to encode the connectivity of 3D meshes.

Recently graph-based methods have been proposed to encode point clouds. The point cloud attributes are compressed using graph transforms in Zhang et al.: "Point cloud attribute compression with graph transform", IEEE International Conference on Image Processing, Paris, 2014. The attributes are treated as signals over the graph and the graph transform is employed to approximately de-correlate the signal. However, the point cloud representation is still based on the octree representation by constructing graphs upon the octree structure. Also, only the compression of attributes except the geometry is considered in this article.

The problem of compression of 3D point cloud sequences is addressed in Thanou et al.: "Graph-based compression of dynamic 3D point cloud sequences", IEEE Transactions on Image Processing, vol. 25, no 4, pages 1765-1778, 2016, with focus on intra coding with graph-based methods. Nevertheless, this approach still adopts the octree representation. In Queiroz et al. "Compression of 3D point clouds using a region-adaptive hierarchical transform", IEEE Transactions on Image Processing, Volume: 25, Issue: 8, August 2016, a method is designed to compress the colors in point clouds based on a hierarchical transform. Meanwhile, the geometry of the point cloud is again encoded using the octree representation.

The aforementioned works are all based on the octree representation and consider the geometry and other attributes separately. This is disadvantageous as the exploration of the piecewise-linearity of the point cloud for coding efficiency is limited by the octree representation. Also, the redundancy between the geometry and the attributes is not taken into account, which eliminates further improvement of the coding performance.

SUMMARY OF THE INVENTION

The present disclosure proposes a solution for improving the situation.

Thus, the disclosure concerns a method for encoding a point cloud and a corresponding encoder. It also concerns a method for reconstructing a point cloud and a corresponding decoder. It further concerns computer programs implementing the encoding and reconstructing methods and a signal according to the present disclosure.

Accordingly, the present disclosure provides a method for encoding a point cloud comprising a plurality of points, in which each point is defined by attributes, the attributes including the spatial position of the point in a 3D space and at least one feature of the point, wherein the method comprises:

segmenting the point cloud into clusters of points on the basis of the attributes of the points;
and for each cluster:
constructing a similarity graph representing the similarity among neighboring points of the cluster in terms of the attributes;
computing a Graph Fourier Transform, GFT, based on the constructed similarity graph, the GFT being characterized by its coefficients; and
quantizing and encoding the GFT coefficients.

Thus, the coding method of the invention jointly compresses the attributes, which include the geometry i.e. the spatial position of the points in the 3D space and at least one other attribute i.e. a feature such as the color or the texture, and exploits the redundancy among them based on the GFT.

By segmenting the point cloud into clusters, the graph transform operation is performed within each cluster and thus it is more efficient in the sense of processing time.

Advantageously, the method comprises, for each cluster, transmitting to a decoder the encoded GFT coefficients and identifiers of the cluster and of the computed GFT.

These identifiers may consist on duster indices and GFT indices in order to indicate to the decoder which GFT is used for which duster so that the decoder can perform the correct inverse transform for the final reconstruction of the point cloud.

According to a preferred embodiment, the encoding of the GFT coefficients is an entropy encoding.

Advantageously, the segmentation of the point cloud into clusters uses a normalized cuts technique.

This technique is described, for instance, in the article of Malik et al.: "Normalized cuts and image segmentation" in IEEE Trans. Pattern Anal. Mach. Intell., Vol. 22, No. 8, pages 888-905, 2000.

Preferably, vertices of the constructed similarity graph consist of the points of the corresponding cluster and the method comprises assigning a weight $w_{i,j}$ between any vertices $P_i$ and $P_j$ of the graph.

Advantageously, the weight $w_{i,j}$ between vertices $P_i$ and $P_j$ is set to 0 if said weight is less than a threshold.

In this way, the small weights are not encoded so as to reduce the overall coding bits while not degrading the coding quality as a small weight means that the corresponding connected vertices are dissimilar to some extent.

Advantageously, constructing the similarity graph comprises adding an edge $e_{i,j}$ between vertices $P_i$ and $P_j$ if the weight $w_{i,j}$ is equal to or greater than the threshold.

The present disclosure also provides an encoder for encoding a point cloud comprising a plurality of points, in which each point is defined by attributes, the attributes including the spatial position of the point in a 3D space and at least one feature of the point, wherein the encoder comprises:

a segmentation module configured to segment the point cloud into clusters of points on the basis of the attributes of the points;

a construction module configured to construct, for each cluster, a similarity graph representing the similarity among neighboring points of the cluster in terms of the attributes;

a computation module configured to compute, for each cluster; a Graph Fourier Transform, GFT, based on the constructed similarity graph, the GFT being characterized by its coefficients; and a coding module configured to encode the GFT coefficients.

Advantageously, the encoder comprises a transmitter configured to transmit to a decoder the encoded GFT coefficients and identifiers of the clusters and of the computed GFTs.

The present disclosure also provides a method for reconstructing a point cloud comprising a plurality of points, in which each point is defined by attributes, the attributes including the spatial position of the point in a 3D space and at least one feature of the point, wherein the method comprises:

receiving data including GFT coefficients associated with cluster indices and GFT indices;

decoding the received data; and reconstructing clusters by performing for each cluster identified by a received cluster index an inverse GFT.

Advantageously, the decoding includes an entropy decoding.

The present disclosure also provides a decoder for reconstructing a point cloud comprising a plurality of points, in which each point is defined by attributes, the attributes including the spatial position of the point in a 3D space and at least one feature of the point, wherein the decoder comprises:

a receiver configured to receive encoded data including GFT coefficients associated with cluster indices and GFT indices;

a decoding module configured to decode the received data; and a reconstruction module configured to reconstruct clusters by performing for each cluster identified by a received cluster index an inverse GFT.

The methods according to the disclosure may be implemented in software on a programmable apparatus. They may be implemented solely in hardware or in software, or in a combination thereof.

Since these methods can be implemented in software, they can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the encoding method of the invention.

The diagram of FIG. 3 illustrates an example of the general algorithm for such computer program.

The disclosure also provides a computer-readable program comprising computer-executable instructions to enable a computer to perform the reconstructing method of the invention.

The diagram of FIG. 4 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
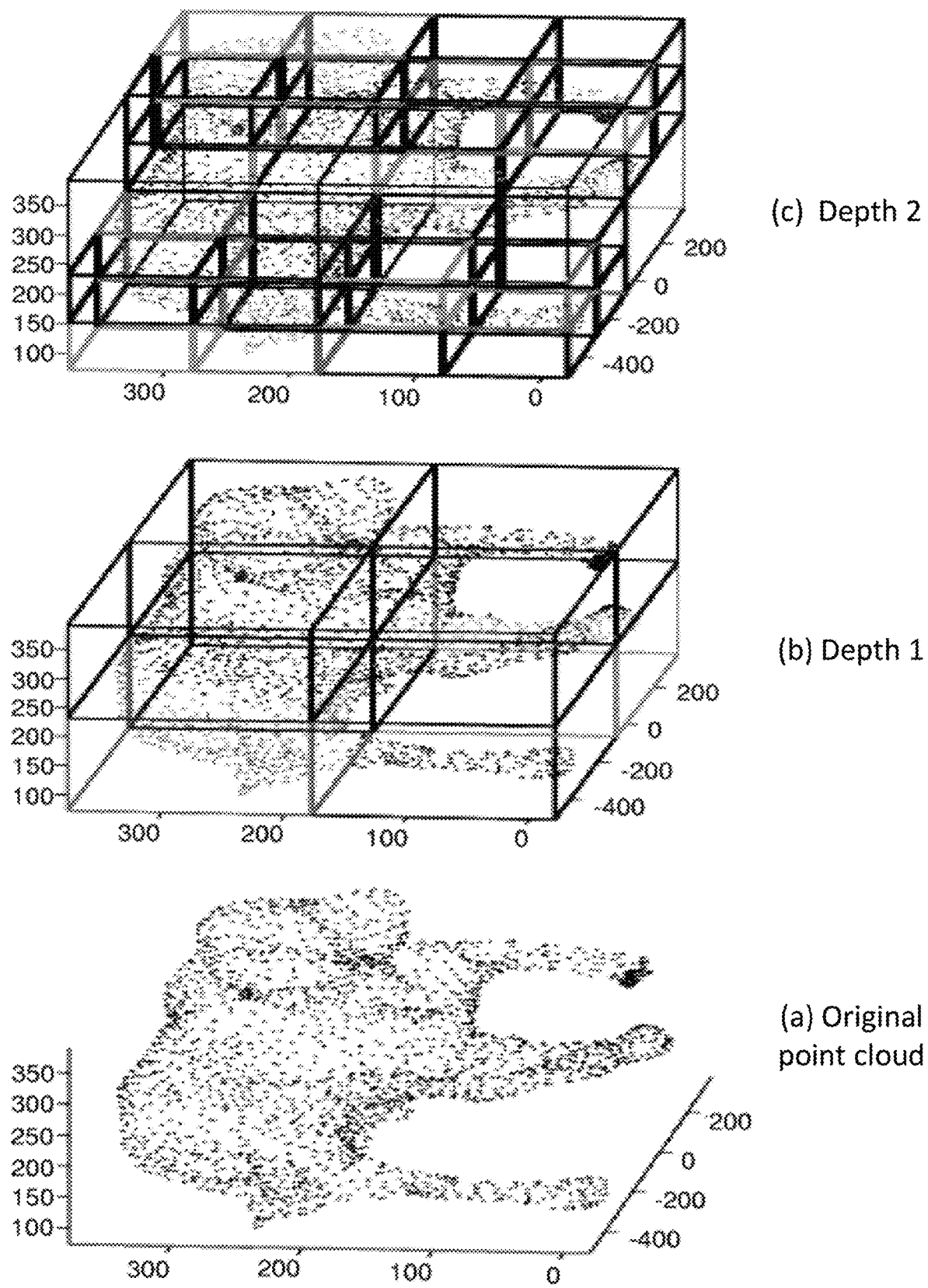
FIG. 1, already described, is a schematic view illustrating an octree-based point cloud representation according to the prior art.
Figure 2:
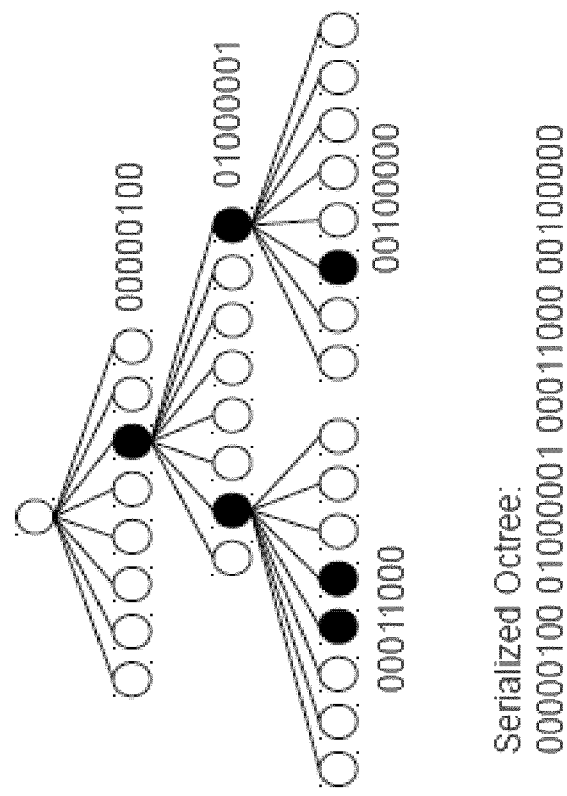
FIG. 2 already described, is a schematic view illustrating an overview of an octree data structure.
Figure 2:
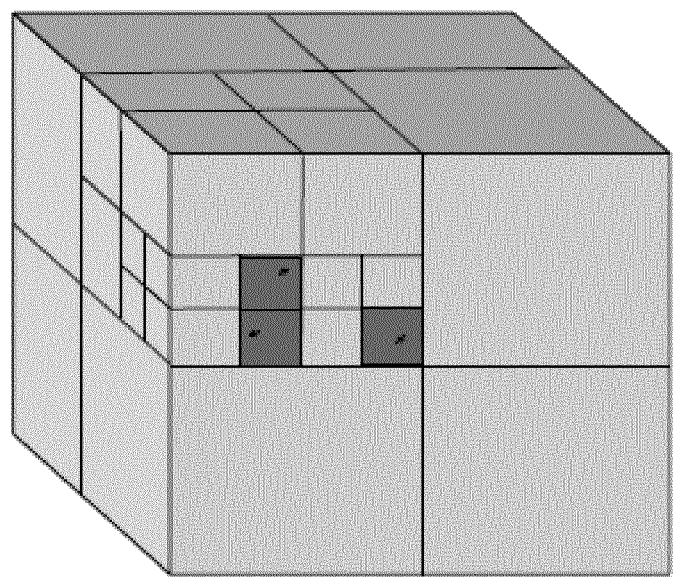
Figure 3:
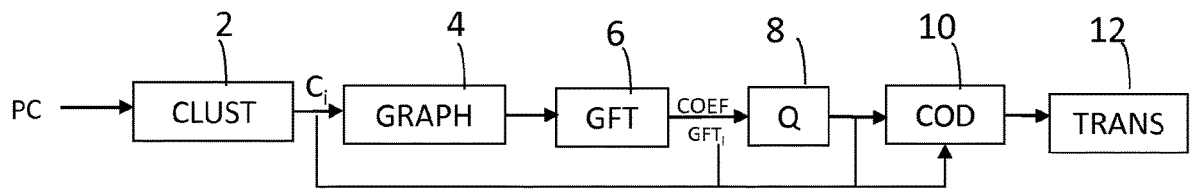
FIG. 3 is a flowchart showing the steps of encoding a point cloud, according to an embodiment of the present invention.

The method of encoding a point cloud according to an embodiment of the present invention is illustrated in the flowchart of FIG. 3.

The points of the point cloud PC are characterized by their attributes which include the geometry, i.e. the spatial position of each point and at least another attribute of the point, such as for example the color. We will assume in the following description that each point of the point cloud has two attributes: the geometry g in the 3D space and the color c in the RGB space.

The point cloud data is classified into several clusters at step 2. As a result of this clustering, the point cloud data in each cluster can be approximated by a linear function as it has generally been observed that most point cloud data has a piecewise linear behavior.

This clustering may be performed by any prior art clustering method.

Advantageously, the clustering is performed using the normalized cuts technique modified, according to the present embodiment, in order to consider similarities between all the attributes of the points of the point cloud.

Thus, when performing clustering, multi-lateral relations are considered. That is, both similarities in the geometry and in the other attributes, such as the color, are taken into account to segment the point cluster in order to achieve a clustering result that exploits the piecewise linear property in an optimal way.

At the end of step 2, the point cloud PC is clustered into a plurality of clusters identified by corresponding indices $C_i$, wherein $1 \leq i \leq N$, where N is the obtained number of clusters.

The cluster indices are assigned randomly, while ensuring that a unique index is assigned for each cluster.

Then, at step 4, a similarity graph is constructed for each cluster. This similarity graph represents the similarity among neighboring vertices, i.e. points, of the cluster and permits to acquire a compact representation of the cluster.

A graph $G=\{V, E, W\}$ consists of a finite set of vertices V with cardinality $|V|=N$, a set of edges E connecting vertices, and a weighted adjacency matrix W. W is a real N×N matrix, where $w_{i,j}$ is the weight assigned to the edge (i, j) connecting vertices Pi and Pj. Only undirected graphs are considered here, which correspond to symmetric weighted adjacency matrices, i.e., $w_{i,j}=w_{j,i}$. Weights are assumed non-negative, i.e., $w_{i,j} \geq 0$.

In the similarity graph constructed at step 4, the weight $w_{i,j}$ between vertex Pi and vertex Pj is assigned as $$w_{i,j} = \exp\left\{-\frac{\|g_i - g_j\|^2 \|c_i - c_j\|^2}{2\sigma^2}\right\}. \quad (1)$$

Where $g_i$ and $g_j$ are the coordinate vectors respectively, i.e., $g_i=(x_i, y_i, z_i)^T$ and $g_j=(x_j, y_j, z_j)^T$; $c_i$ and $c_j$ are the color vectors respectively, i.e., $c_i=(r_i, g_i, b_i)^T$ and $c_j=(r_j, g_j, b_j)^T$. In this formula, $\|g_i-g_j\|^2$ describes the similarity in the geometry and $\|c_i-c_j\|^2$ describes the similarity in the color.

σ is a parameter used to control the weight value and is often set empirically.

In this way, both the geometry and color information are taken into consideration in the constructed graph, which is different from the usual definition of edge weights, which only considers the similarity in one attribute.

According to a preferred embodiment and in order to reduce the number of connected vertices for sparse representation, a threshold t is used to set small weights to 0 as follows:

$$w_{i,j}=0, \text{ if } w_{i,j}<t \quad (2).$$

In this way, small weights won't be encoded so as to save coding bits. Also, as these weights are small, which means the connected vertices are dissimilar to some extent, setting these weights to 0 almost does not degrade the coding quality.

Thus, the graph is constructed as follows.

For each point Pi of the cluster, the possible edge weight between it and any other point Pj in the cluster is calculating according to equation (1). If $w_{i,j}>=t$, an edge $e_{i,j}$ between Pi and Pj is added and the calculated weight $w_{i,j}$ is attached to the edge, otherwise, Pi and Pj are disconnected as a small weight means that there's a large discrepancy between them.

Then, at step 6, the GFT is calculated for each cluster based on the constructed similarity graph.

At this step, the weighted adjacency matrix is obtained from the weights of the graph.

Then, the graph Laplacian matrix is computed.

There exist different variants of Laplacian matrices.

In one embodiment, the unnormalized combinatorial graph Laplacian is deployed, which is defined as L:=D−W, where D is the degree matrix defined as a diagonal matrix whose i-th diagonal element is the sum of all elements in the i-th row of W, i.e., $d_{i,i}=\Sigma_{j=1}^{N} w_{i,j}$. Since the Laplacian matrix is a real symmetric matrix, it admits a set of real eigenvalues $\{\lambda_l\}_{l=0, 1, \ldots, N-1}$ with a complete set of orthonormal eigenvectors $\{\psi_l\}_{l=0, 1, \ldots, N-1}$, i.e., $L\psi_l=\lambda_l\psi_l$, for l=0, 1, ..., N−1.

This Laplacian matrix is employed in one embodiment for two reasons.

First, as the elements in each row of L sum to zero by construction, 0 is guaranteed to be an eigenvalue with $[1 \ldots 1]^T$ as the corresponding eigenvector. This allows a frequency interpretation of the GFT, where the eigenvalues $\lambda_l$'s are the graph frequencies and always have a DC component, which is beneficial for the compression of point cloud data consisting of many smooth regions. By connecting similar points and disconnecting dissimilar ones, high-frequency coefficient are reduced, which leads to a compact representation of the point cloud in the GFT domain.

Second, GFT defaults to the well-known DCT when defined for a line graph (corresponding to the 1D DCT) or a 4-connectivity graph (2D DCT) with all edge weights equal to 1. That means that the GFT is at least as good as the DCT in sparse signal representation if the weights are chosen in this way. Due to the above two desirable properties, the unnormalized Laplacian matrix is used for the definition of the GFT as described in the following paragraph.

The eigenvectors $\{\psi_l\}_{l=0, 1, \ldots, N-1}$ of the Laplacian matrix are used to define the GFT. Formally, for any signal $x \in \mathcal{R}^N$ residing on the vertices of G, its GFT $\hat{x} \in \mathcal{R}^N$ is defined as $$\hat{x}(l)=\langle\psi_l,x\rangle=\Sigma_{n=1}^{N}\psi_l^*(n)x(n), l=0,1,\ldots,N-1. \quad (3)$$

where $\hat{x}(l)$ is the l-th GFT coefficient, where x(n) refers here to the attributes of the point n of the point cloud.

For each cluster, the obtained GFT is identified by a GFT index.

Thus, step 6 results in the GFT coefficients and the GFT indices.

Then, at step 8, the GFT coefficients are quantized.

At step 10, the quantized GFT coefficients are entropy coded, for example by using the CABAC method described in Marpe: "Context-Based Adaptive Binary Arithmetic Coding in the H.264/AVC Video Compression Standard", IEEE Trans. Cir. and Sys. For Video Technol., vol. 13, no. 7, pages 620-636, 2003.

Also, the overhead, constituted by the cluster indices and the GFT indices, is entropy coded at step 10 to indicate which GFT is used for which cluster. The encoded GFT coefficients, cluster indices and GFT indices are then transmitted, at step 12, to a decoder.

Figure 4:
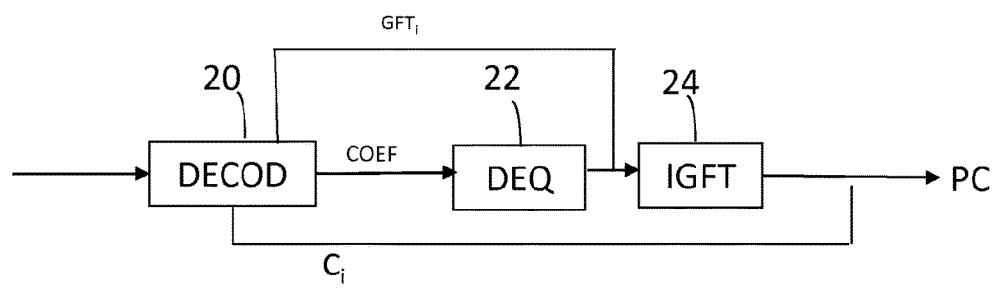
FIG. 4 is a flowchart showing the steps of reconstructing a point cloud, according to an embodiment of the present invention.

FIG. 4 shows the steps of reconstructing a point cloud, i.e. the decoding steps implemented by the decoder after receiving the encoded GFT coefficients, cluster indices and GFT indices, according to an embodiment of the present disclosure.

At step 20, the received GFT coefficients, cluster indices and GFT indices are entropy decoded.

Then, at step 22, the decoded GFT coefficients are dequantized.

At step 24, an inverse GFT is performed using the dequantized GFT coefficient and the decoded GFT indices which indicate the applied GFT.

The inverse GFT is given by:

$$x(n)=\Sigma_{l=0}^{N-1}\hat{x}(l)\psi_l(n), n=1,2,\ldots,N. \quad (4)$$

where x is the recovered signal representing the point cloud data of each cluster.

According to an embodiment, the graph Fourier transform is calculated as follows, where each point in the point cloud is treated as a vertex in a graph.

Firstly, each point is connected to its neighbors as long as they are similar. Two points are disconnected if there is a large discrepancy between them.

Secondly, given the connectivity graph, the adjacency matrix W is defined, where $w_{i,j}=w_{j,i}=1$ if vertex i and j are connected, and 0 otherwise. The degree matrix D is then computed.

In a third step, using computed matrices W and D, the graph Laplacian matrix is computed as L=D−W. The eigenvectors U of L are the basis vectors of the GFT. Finally, the attributes of the points of the point cloud are stacked into a column vector, and the GFT and inverse GFT are computed according to equations 3 and 4.

By connecting similar points and disconnecting dissimilar ones, high-frequency coefficients are reduced, thus leading to compact representation of point clouds in the GFT domain.

Figure 5:
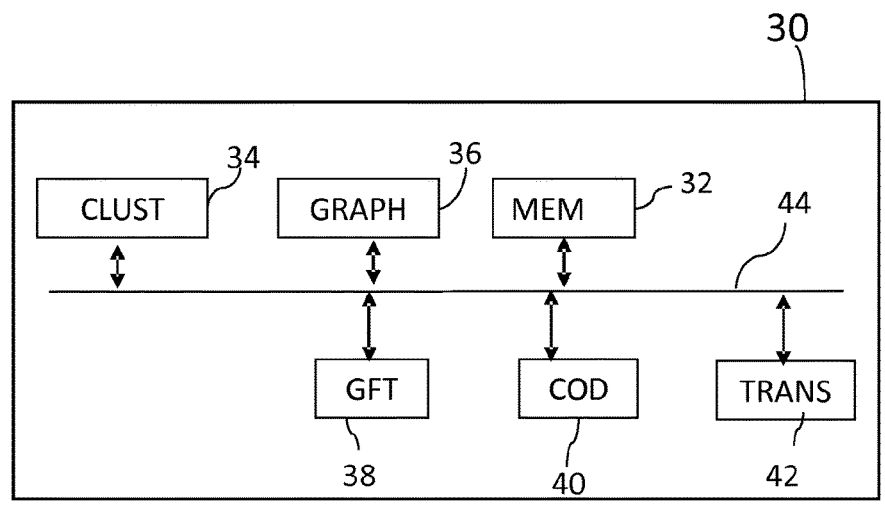
FIG. 5 is a schematic view illustrating an encoder, according to an embodiment of the invention.

FIG. 5 is a block diagram of an exemplary embodiment of an encoder 30 implementing the encoding method of the present disclosure.

Advantageously, the encoder 30 includes one or more processors and a memory 32.

The encoder 30 comprises:
- a segmentation module 34 configured to segment the point cloud into clusters of points on the basis of the attributes of the points;
- a construction module 36 configured to construct, for each cluster, a similarity graph representing the similarity among neighboring points of the cluster in terms of the attributes;
- a computation module 38 configured to compute, for each cluster; a Graph Fourier Transform, GFT, based on the constructed similarity graph, the GFT being characterized by its coefficients; and
- a coding module 40 configured to encode the GFT coefficients.

The encoder 30 also comprises a transmitter 42 configured to transmit to a decoder the encoded GFT coefficients and identifiers of the clusters and of the computed GFTs.

According to the represented embodiment, a bus 44 provides a communication path between various elements of the encoder 30. Other point-to-point interconnection options (e.g. non-bus architecture) are also feasible.

Figure 6:
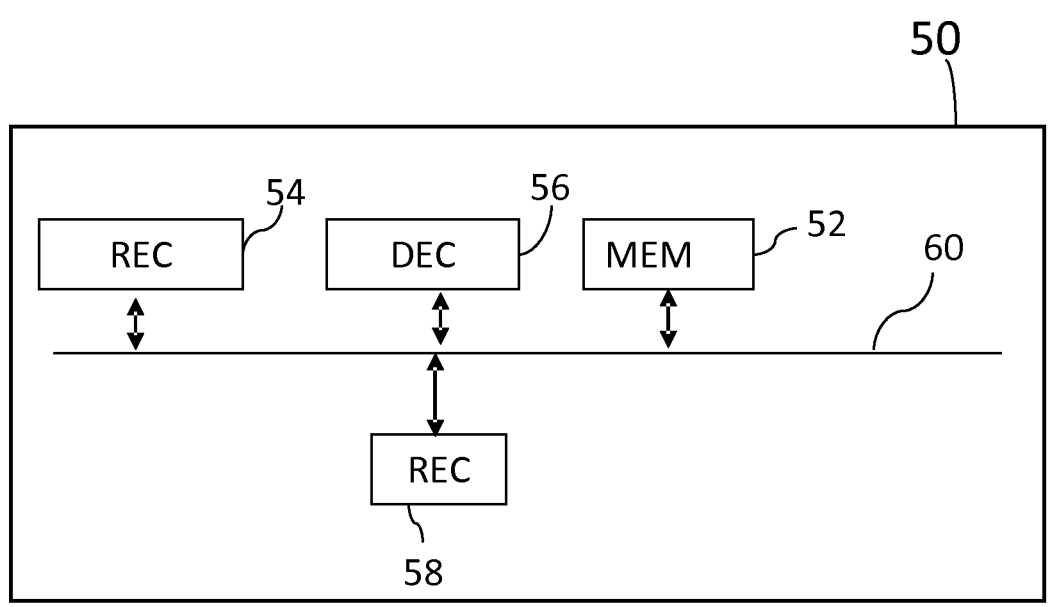
FIG. 6 is a schematic view illustrating a decoder, according to an embodiment of the invention.

FIG. 6 is a block diagram of an exemplary embodiment of a decoder 50 implementing the reconstructing method of the present disclosure.

Advantageously, the decoder 50 includes one or more processors and a memory 52.

The decoder 50 comprises:
- a receiver 54 configured to receive encoded data including GFT coefficients associated with cluster indices and GFT indices;
- a decoding module 66 configured to decode the received data; and
- a reconstruction module 58 configured to reconstruct the clusters by performing for each cluster an inverse GFT.

According to the represented embodiment, a bus 60 provides a communication path between various elements of the decoder 50. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

For instance, even if the described graph transform is a GFT, other graph transforms may also be used such as, for example, wavelets on graphs, as described in D. Hammond, P. Vandergheynst, and R. Gribonval, "Wavelets on graphs via spectral graph theory" in Elsevier Appplied and Computational Harmonic Analysis, vol. 30, April 2010, pp. 129-150, and lifting transforms on graphs, as described in G. Shen, "Lifting transforms on graphs: Theory and applications" in Ph.D. dissertation, University of Southern California, 2010.

The invention claimed is:

1. A method comprising:
   segmenting a point cloud comprising a plurality of points into multiple clusters of points such that both similarities in spatial positions of the points in a 3D space and in at least one other attribute of the points are taken into account to segment the plurality of points, the at least one other attribute of a point comprising an information representative of a color, an information representative of a texture, or an information representative of the color and the texture of the point;
   once the point cloud is segmented into multiple clusters, representing each cluster of points with a graph-based representation, said graph-based representation having a plurality of vertices and at least one edge connecting two vertices, an edge comprising an indicator capturing similarities of multiple attributes of two neighboring points of a cluster; and
   for each cluster:
      applying a graph Fourier transform to each cluster based on the at least one indicator to obtain transform coefficients, and
      encoding the transform coefficients and an information associating a cluster index to a graph Fourier transform index to indicate which graph Fourier transform is used for the cluster.

2. The method of claim 1, wherein, for at least one cluster, the method further comprises transmitting the encoded transform coefficients and identifiers of the clusters representative of transforms applied to the transform coefficients.

3. A non-transitory computer readable storage medium having program code instructions stored thereon which are executable by a processor to cause the processor to implement the method according to claim 1.

4. The method of claim 1, wherein an indicator of an edge connecting two vertices Pi and Pj is a weight $w_{i,j}$ defined by:

$$w_{i,j} = \exp\left\{-\frac{\|g_i - g_j\|^2 \|c_i - c_j\|^2}{2\sigma^2}\right\}$$

where gi and gj are vectors representing, respectively, spatial position of points Pi and Pj, and cj are vectors representing, respectively, another feature of points Pi and Pj and σ is a parameter used to control the weight value.

5. The method of claim 4, wherein if a weight is less than a threshold, said weight is set to 0 and corresponding vertices are disconnected.

6. A device comprising electronic circuitry adapted for:

segmenting a point cloud comprising a plurality of points into multiple clusters of points such that both similarities in spatial positions of the points in a 3D space and in at least one other attribute of the points are taken into account to segment the plurality of points, the at least one other attribute of a point comprising an information representative of a color, an information representative of a texture, or an information representative of the color and the texture of the point;

once the point cloud is segmented in a plurality of clusters, representing each cluster of points with a graph-based representation of each cluster of points, said graph-based representation having a plurality of vertices and at least one edge connecting two vertices, an edge comprising an indicator capturing similarities of multiple attributes of two neighboring points of a cluster; and for each cluster:

applying a graph Fourier transform to each cluster based on the at least one indicator to obtain transform coefficients, and encoding the transform coefficients and an information associating a cluster index to a graph Fourier transform index to indicate which graph Fourier transform is used for the cluster.

7. The device of claim 6, wherein, for at least one cluster, the electronic circuitry is further configured for transmitting the encoded transform coefficients and identifiers of the clusters representative of transforms applied to the transform coefficients.

8. The device of claim 6, wherein an indicator of an edge connecting two vertices Pi and Pj is a weight $w_{i,j}$ defined by:

$$w_{i,j} = \exp\left\{-\frac{\|g_i - g_j\|^2 \|c_i - c_j\|^2}{2\sigma^2}\right\}$$

where $g_i$ and $g_j$ are vectors representing, respectively, spatial position of points Pi and Pj, $c_i$ and $c_j$ are vectors representing, respectively, another feature of points Pi and Pj and $\sigma$ is a parameter used to control the weight value.

9. The device of claim 8, wherein the electronic circuitry is further configured for setting a weight to 0 if the weight is less than a threshold, and for disconnecting corresponding vertices.

* * * * *